United States Patent [19]

Wolf

[11] Patent Number: 4,836,925

[45] Date of Patent: Jun. 6, 1989

[54] DEVICE FOR A FILTER DEVICE

[76] Inventor: Joachim Wolf, Malmsheimer Str. 67, 7252 Weil der Stadt, Fed. Rep. of Germany

[21] Appl. No.: 194,299

[22] Filed: May 16, 1988

[51] Int. Cl.$^4$ .............................................. B01D 27/08
[52] U.S. Cl. ................................ 210/323.2; 210/444; 210/450; 210/452; 210/454
[58] Field of Search ................. 210/323.1, 323.2, 440, 210/443–445, 450–452, 454, 455, 462, 497.01

[56] References Cited

U.S. PATENT DOCUMENTS

| | | | |
|---|---|---|---|
| 966,963 | 8/1910 | Steinkoenig | 210/455 X |
| 1,999,913 | 4/1935 | Merritt | 210/454 X |
| 2,809,754 | 10/1957 | Pudlo | 210/443 |
| 3,017,032 | 1/1962 | Urdanoff | 210/323.2 X |
| 3,592,768 | 7/1971 | Parker | 210/445 |
| 3,692,186 | 9/1972 | Marzocchi | 210/497.1 X |
| 3,897,342 | 7/1975 | Schmid et al. | 210/445 |
| 4,298,465 | 11/1981 | Druffel | 210/444 X |
| 4,537,681 | 8/1985 | Argiropoulos et al. | 210/400 X |
| 4,692,245 | 9/1987 | Church et al. | 210/444 X |
| 4,711,717 | 12/1987 | Wolf | 210/323.2 X |

FOREIGN PATENT DOCUMENTS

| | | | |
|---|---|---|---|
| 2403166 | 11/1974 | Fed. Rep. of Germany | 210/444 |
| 1336796 | 11/1973 | United Kingdom | 210/444 |
| 2130912 | 6/1984 | United Kingdom | 210/443 |

Primary Examiner—Robert Spitzer

[57] ABSTRACT

Device for a filter device, having a circular adapter, having at least one connector extending downwards out of the adapter, to which connector a filter cartridge is attachable, having a feed hole in the adapter, having an outflow volume above the adapter and communicating with the connector, having a circular head above the adapter, having a feed connector which extends upwards out of the head and communicates with the feed hole, and having an outflow connector which extends upwards out from the head and communicates with the outflow volume, characterized by the following features:

(a) the adapter and the head are in one piece.
(b) In their circumferential regions the adapter and the head are connected tightly against medium and mechanically rigidly by a circumferential wall.
(c) around the feed hole and around the feed connector the adapter and the head are connected tightly against medium and mechanically rigidly with one another by an inner wall.

12 Claims, 4 Drawing Sheets

DEVICE FOR A FILTER DEVICE

This invention relates to a filter device.

BACKGROUND OF THE INVENTION AND RELEVANT PRIOR ART

Such a device includes the following features: a circular adapter, at least one connector extending downwards out of the adapter, to which connector a filter cartridge is attachable, a feed hole in the adapter, an outflow volume means above the adapter and communicating with the connector, a circular head above the adapter, a feed connector which extends upwards out of the head and communicates with the feed hole, and an outflow connector which extends upwards out of the head and communicates with the outflow volume means.

Such a device has become known in the prior art from U.S. Pat. No. 4,711,717, which issued Dec. 18, 1987 to this inventor. According to FIG. 6 thereof an adapter 62 is provided which comprises downwardly extending connectors 61. Filter cartridges 52 are attachable to these. The adapter has a feed hole 79. In the central zone 76 an outflow volume is provided. The head 78 with the feed connector 81 and the outflow connector 77 are also seen.

In this design the following was disadvantageous:

(a) When the filter was exhausted and the clamping plate 84 and the head 78 were removed, filtrate was able to spread out on the upper side of the adapter 62. However, in the case of some (dangerous) substances the washing already caused difficulties.

(b) The adapter too must be washed before further use.

(c) An extraordinarily high pressure must be applied if it is intended to obtain tightness, which also means tightness to gases, between the marginal zone of the adapter and the marginal zone of the head. If the adapter and the head are of synthetic plastic material, and if the pressure utilized to obtain tight conditions is very great, as is known the material can flow and the whole becomes unsealed in the marginal zones.

(d) If in the prior art it is intended to have surface sealing without the use of additional seals, then the surfaces facing one another must be extremely planar. The diameter of such devices is however of the order of size for example of 10–30 cm. and it is very difficult to produce planar surfaces cheaply by injection-molding or in any other way, which are plane in the sense of gas-tightness and/or fluid-tightness.

(e) Both the adapter and the head must be of extraordinarily rigid material and the zone between the outflow volume for the one part and the feed hole and the feed connector for the other part must also be sealed, even though here no sealing pressure can be applied between the clamping plate and the bowl. These conditions are extraordinarily difficult to fulfill. A slight excess pressure in the outflow volume can generate extraordinarily high forces, because it acts upon relatively large areas. If, therefore, for example, the adapter bends somewhat downwards, a gap occurs so that a short-circuit can occur between the feed connector and the outflow connector. Then this gap can no longer reduce to zero if there were particles in the fluid.

Excess pressures can also occur in the outflow volume, as for example when a non-return valve closes quickly or the like.

Then without doubt the pressure between the clamping ring and the clamping plate in the circumferential zone suffices to produce tightness, as before. It is not possible to determine whether a short-circuit has taken place in the interior or not, however.

OBJECT AND STATEMENT OF THE INVENTION

It is the object of the invention to provide a device which avoids these disadvanatages as a whole.

This object is achieved by the following features of the invention:

(a) The adapter and the head are in one piece.

(b) The adapter and the head have circumferential regions and a circumferential wall thereat connecting the adapter and the head mechanically rigidly and tightly against medium, and (c) An inner wall connects the adapter and the head mechanically rigidly and tightly against medium around the feed hole and around the feed connector.

The described embodiment includes the following additional advantageous features:

A sealing and clamping edge extends radially outwards from the circumferential regions. In the region of the outflow volume no force is exerted upon the head or the adapter by the clamping device, which naturally must be present, so that the head and the adapter can be made relatively light and thin. More especially, the adapter no longer needs to be made from a thick plate and it is possible to save an extraordinary amount of material. In the case of this solution, no fluid is situated in the sealing and clamping edge, and none can be situated, as could be possible in the case of the prior art.

The adapter has a floor and the height of the space of the outflow volume means is many times greater than the thickness of the floor, and the inner wall and the circumferential wall are correspondingly high. This produces a relatively large outflow volume with a simultaneously thin and thus material-saving floor of the adapter. If the outflow volume is great then the pressures can equalize within the outflow volume and it is not necessary to provide any special milled incisions which were necessary in the floor of the adapter in the prior art. Moreover, it is now no longer necessary to place the outflow connector at a central position. It can now be placed at a non-central position, and nevertheless the flow resistance from the filter cartridge connector is the same. Nonetheless, no short-circuit of fluid can occur.

The height is at least five times greater. A light device which is however favorable as regards flow is obtained by this feature.

Transverse connectors subjectable to tension stress extend through the outflow volume means from the head at its under side to the adapter at its upper side. The device becomes very rigid despite low material consumption, and the parallelism between the adapter and the head is maintained, even if the fluid is hot and/or excess pressure or negative pressure occurs and/or the filter cartridges are relatively heavy, etc.. The transverse connectors comprise rods of the material of the head and the adapter, and the rods are integral with both. There are no sealing problems which would occur if the rods were to be pushed through the floor of the head or the adapter.

The transverse connectors extend perpendicularly from the upper side and the under side. The transverse connectors are subjected only to traction or compression stress, but hardly to buckling stress, or this stress is present substantially less than if they were to stand obliquely.

A mirror weld seam extends parallel to the head at its under side and the adapter at its upper side and passes through the circumferential wall and the inner wall. The device can be produced from two individual parts, namely the initially separately produced head and the separately produced adapter. In the case of the two-part production it is possible without major effort to produce the entire head and the entire adapter, including the transverse connectors, the connection pipes, the sealing and clamping edge, etc., with one two-part injection-molding tool. In the case of mirror welding the two halves to be united with one another are pressed onto a hot plate. For this it is a prerequisite that the head and the adapter are produced from thermoplastic material. Then this "mirror" is drawn away radially outwards and the head and the adapter are guided towards one another, so that reliable welding is effected.

Naturally this device could also be produced from three or more parts. Moreover, there are methods in which synthetic plastic material is injection-molded around a core and this core is later washed out again.

The individual parts of the device could naturally also be connected with one another by adhesion.

A mirror weld seam passes through the transverse connectors. It is also possible to connect the transverse connectors with one another in the interior of the device.

The head and the adapter are of a thermoplastic material. Mirror welding proceeds optimally with this feature.

The device has a marginal zone, and the feed connector and the outflow connector are positioned in the marginal zone and within the circumferential wall. Space is gained for the necessary attachments between the connectors. Moreover, the connectors reinforce the marginal zone if they are arranged there, and maneuverability is also increased.

The feed connector and the outflow connector lie on a line deviating from a diameter line of the adapter and the head. The feed connector is not confused with the outflow connector, namely as regards the fitting of the clamping plate and also as regards the fitting of the attachments.

DESCRIPTION OF THE DRAWINGS

The invention will now be described by reference to a preferred embodiment. Where details are not described, reference is made to the drawings. In the drawings.

DETAILED DESCRIPTION OF A PREFERRED EMBODIMENT

Figure 1:
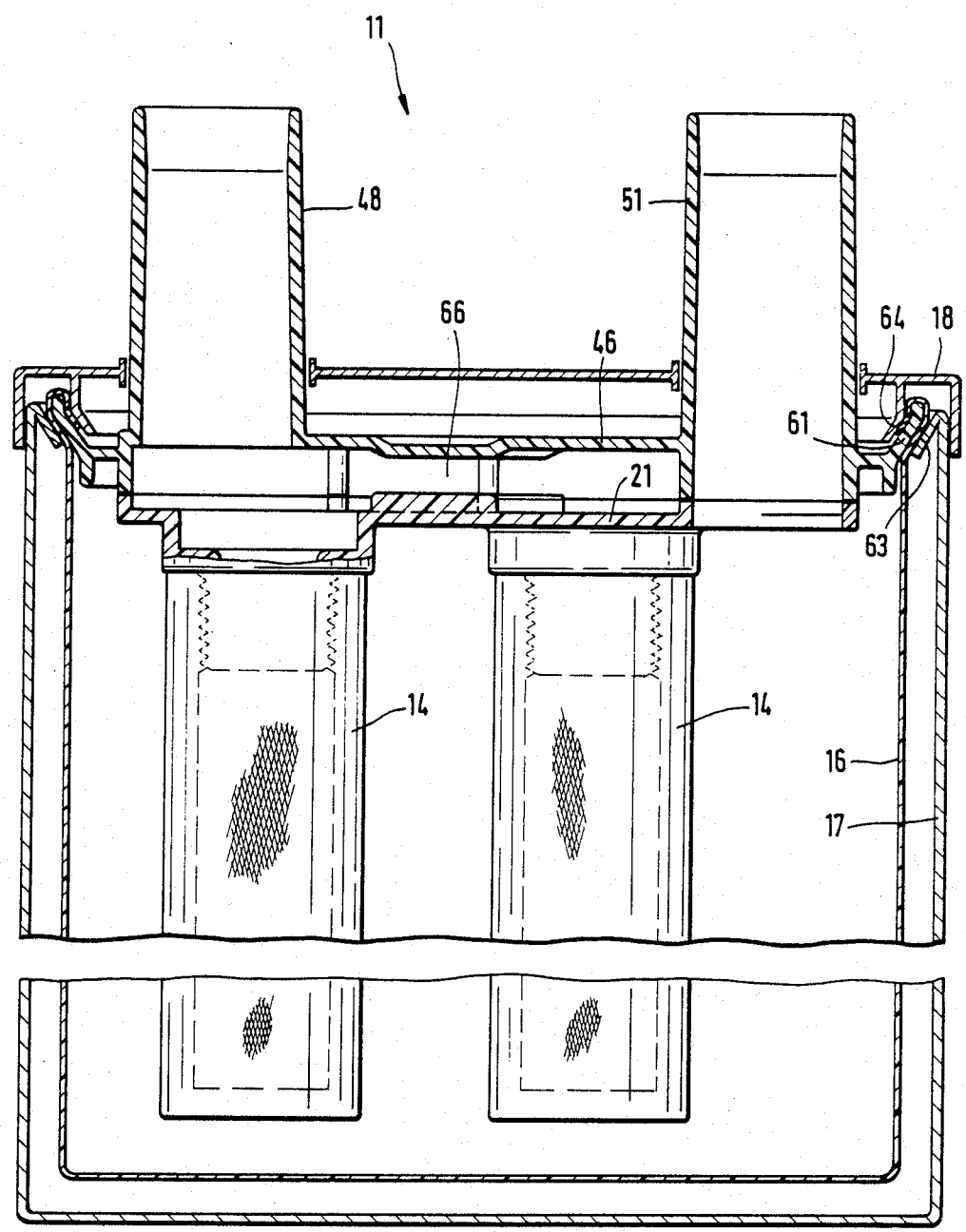
FIG. 1 shows a cross-section through the device in the completed condition with filter cartridges, indicated the bowl and the clamping plate.

A filter device 11 comprises essentially a head 12, an adapter 13, cartridges 14, a flexible pipe 16, a bowl 17 and a lid 18, similarly to German OS No. 35 20 139.

Figure 4:
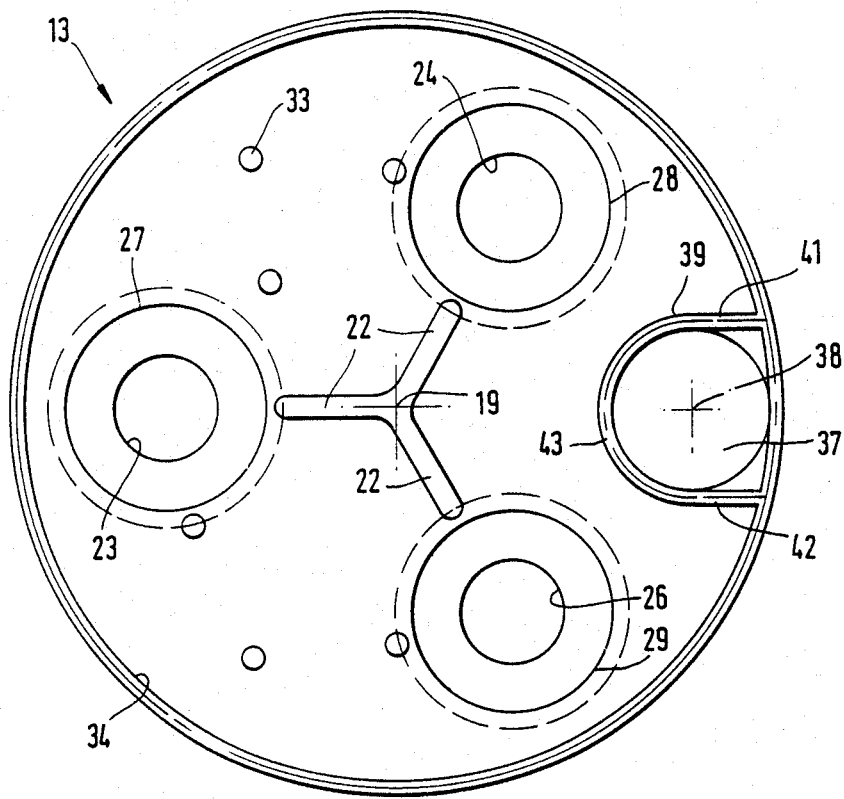
FIG. 4 shows plan view of the adapter.

The adapter 13 has a geometrical central axis 19 which is perpendicular to the floor 21, which is about 3 mm. thick. As may be seen from FIGS. 2 and 4, the adapter 13 can be injection-moulded in one piece without push member with a two-part injection-moulding tool, since no undercut zones occur. The floor 21 is circular. On its upper side 32 it has three short ribs 22 staggered by 120° which are about 2 mm. high and point each to the middle of the likewise staggered connectors 23, 24, 26. The connectors 23, 24, 26 are connected respectively through shallow cups 27, 28, 29 which protrude downwards from the floor 21 and have a considerably larger diameter than the connectors 23, 24, 26. The cups 27, 28, 29 serve firstly for the mechanical reinforcement of the floor 21. They also form a kind of funnel which makes the outflow of the fluid more favourable as regards flow. Thirdly by their shoulders 31, which stand perpendicular to the longitudinal extent of the connectors, they form a stop for the upper edges of the cartridges 14, which is more favourable than if these were to strike directly on the under side of the floor 21.

On the upper side 32 there are column stubs 33 with circular-cylindrical cross-section, about 2 mm. high. According to FIG. 4 six of these are provided, namely at those points where the floor 21 could best bulge out. As may be seen from FIG. 2, the ribs 22 are equally high. On the circumference of the floor 21 there extends a vertically upwardly directed part-circumferential wall 34 which has a solid cross-section, where it is 2 mm. high. In its height going beyond that it merges into a roof 36 which upwardly forms a sharp edge. The roof then contains the material surplus for the subsequent mirror welding. The part-circumferential wall 34 is likewise about 3 mm. thick. A partial inner wall 39 is provided extending upwards on the floor. The partial inner wall 39 surrounds a feed hole 37 which directly adjoins the part-circumferential wall 34, in the floor 21, according to FIG. 4. According to FIG. 4 the feed hole lies at 3 o'clock, while the connectors 23, 24, 26 lie respectively at 1 o'clock, 5 o'clock and 9 o'clock, that is on the angle bisector between the connectors 24 and 26. It has wall zones 41, 42 departing parallel with one another from the part-circumferential wall 34 and merging into a semi-circular arc 43. If desired, the region of the part-circumferential wall 34 extending to the right from the wall regions 41, 42 can at the same time be associated in function with the partial inner wall 39. Both walls are identical there. The feed hole 37 reaches to about half distance between part-circumferential wall 34 and geometrical central axis 19. The area of the feed hole 37 is substantially greater than the clear internal area of the connectors 23, 24, 26 (taken individually). In total the area of the feed hole 37 corresponds at least approximately to the sum of the clear internal areas of the connectors 23, 24, 26. The feed hole 37 has a geometrical central axis 38. In outline and height the partial inner wall 39 corresponds to the part-circumferential wall 34.

The head 12 is injection-moulded in one piece from thermoplastic synthetic plastics material. It has a geometrical central axis which in the completed condition is in alignment with the geometrical central axis 19. The head 12 has a floor 46 which is about 13 mm. thick. Its middle zone is stiffened by three ribs 47 which protrude downwards, merge into one another at their roots and are arranged with equal angular spacing. According to FIG. 2 in the left marginal zone of the floor 46 an outflow connector 48 extends upwards which is about 60 mm. high and penetrates downwards to the floor 46 with a circular piercing 49. The outflow connector 48 lies at about 8 o'clock according to FIG. 3. A feed connector 51 lies at 3 o'clock according to FIG. 3, likewise in the external marginal region of the floor 21. Its geometrical central axis 52 is aligned in the completed condition with the geometrical central axis 38 of the feed hole 37. Beneath the under side 53 of the floor 46 the feed connector 51 continues about 1 cm. There with its continuation it forms a partial inner wall 53 which is practically identical in outline with the partial inner wall 39, more especially is coincident in essential zones and likewise merges in the end zone into a roof like the roof 36.

The floor 46 of circular disc form, which is concentric with the geometrical central axis 44, has fully externally a part-circumferential wall 54 which extends downwards as far as does the partial inner wall 53 and likewise merges into a roof. The part-circumferential walls 34, 54 lie coincidingly in the completed condition.

From the under side 53 columns 56 about 1 cm. long protrude downwards, which are coincident with the column stubs 33 when the geometrical longitudinal axes 38, 52 are in alignment.

Figure 2:
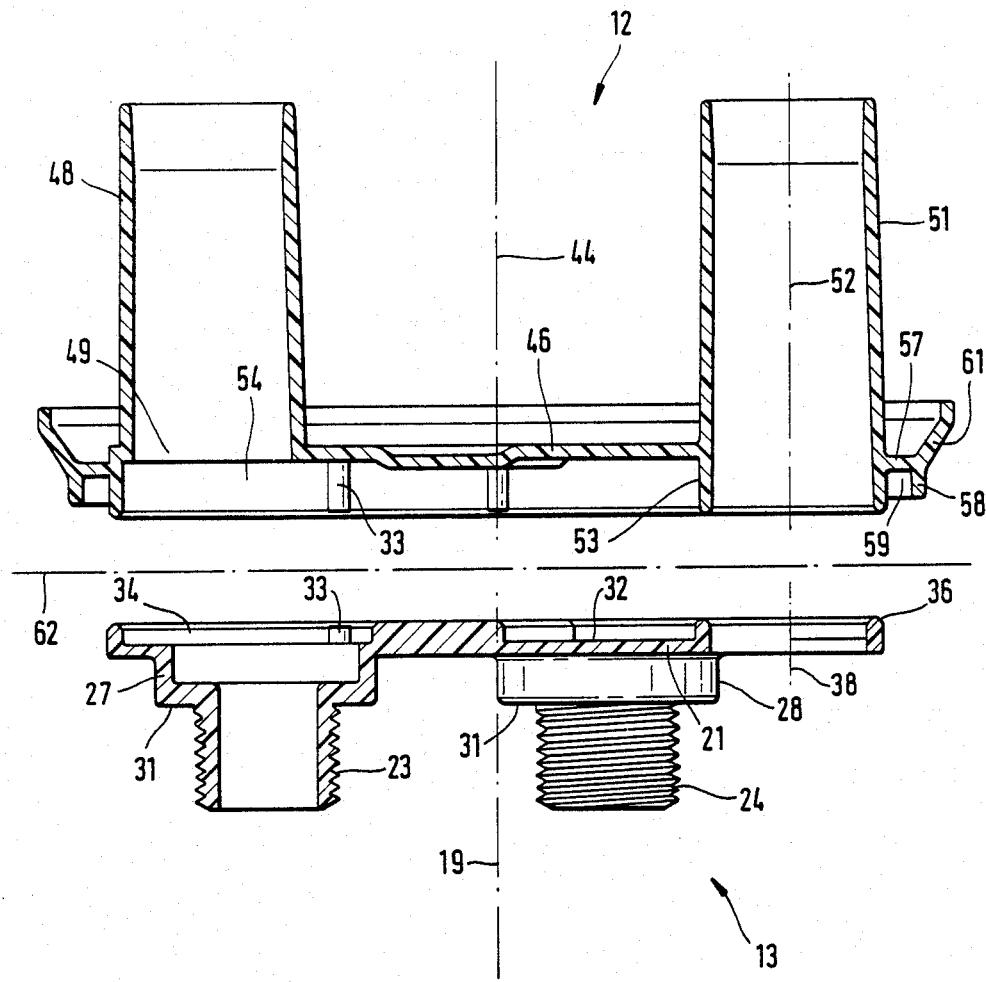
FIG. 2 shows the device in a position before mirror welding, in section.
Figure 3:
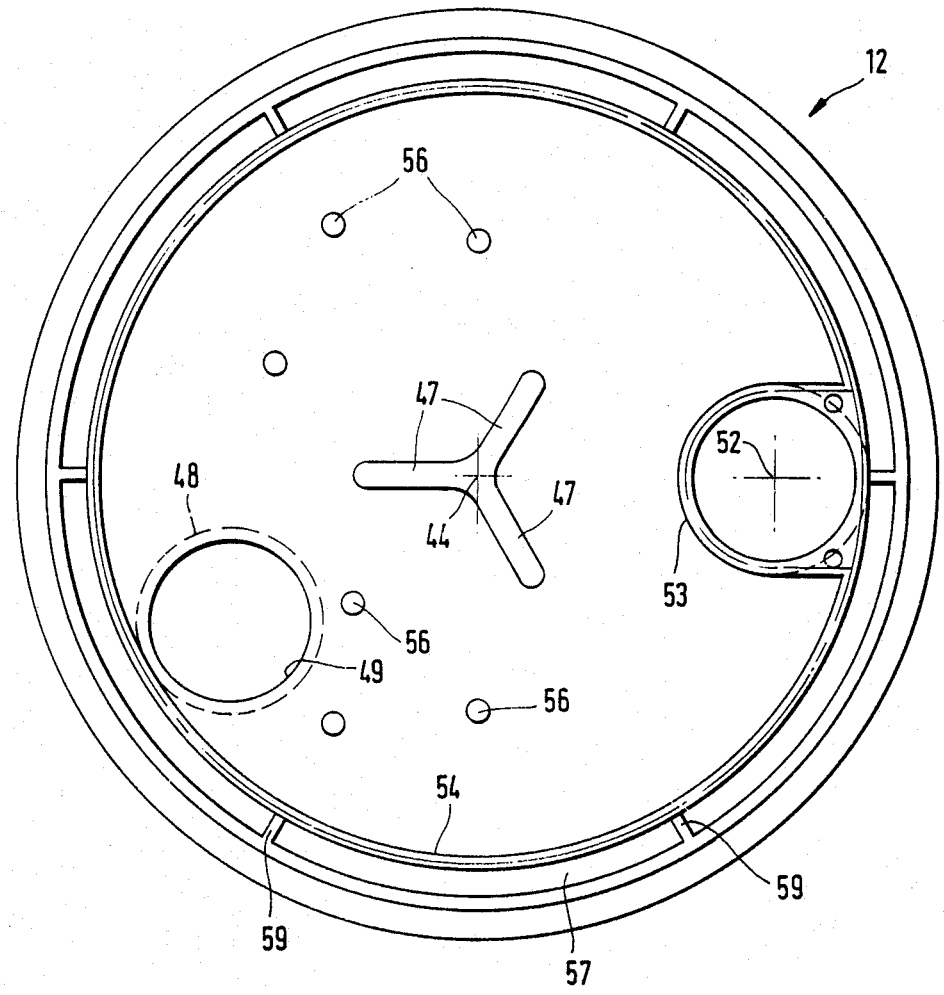
FIG. 3 shows view from beneath the head.

According to FIG. 2, somewhat lower than the floor 46 the part-circumferential wall 54 merges into an annular, horizontal short flange 57, which is connected, tightly against medium, with the part-circumferential wall 54 and also is itself tight to medium. It is coaxial with the central axis 44. At its outer end zone it branches off downwards through 90° into a reinforcing edge 58 of about 3 mm. thickness, which however ends above the roof of the part-circumferential wall 54. The under side of the reinforcing edge 58 is thus outside the action of the heating device for the mirror welding. Between the reinforcing edge 58 and the part-circumferential wall 54 there extend reinforcing ribs 59 at angularly equal intervals. These too do not reach as far as a mirror welding device.

The flange 57 merges outwards into a coaxial sealing and clamping edge 61 in integral and medium-tight manner, namely at an angle of about 60° to the horizontal. The sealing and clamping edge 61 also has about the same thickness as the floor 46, that is about 3 mm.

For the production of a one-piece, welded device a heated plate, which is hotter than the fusing temperature of the thermoplastic material, is brought into the plane 62 (FIG. 2). The adapter 13 is pressed from beneath and the head 12 from above against this plate, the geometrical longitudinal axes 19, 44 and 38, 52 being aligned. Then the plate is drawn out laterally and the head 12 and the adapter 13 are forthwith moved towards one another, so that the volumes of the part-circumferential walls 34, 54 and partial inner walls 39, 53, which have become soft in the roof region, are fused in media-tight manner with one another.

Such a finished device is connected in media-tight manner with the upper edge of the flexible pipe 16 according to FIG. 1, in a manner which is of no interest here, and set into the bowl 17. Then its sealing face 63 lies from beneath against the sealing and clamping edge 61. A sealing face 64 of the lid 18 abuts from above and the outflow connector 48 and the feed connector 51 pass through this lid in suitable apertures. The lid 18 is braced downwards against the bowl 17.

When the cartridges 14 are exhausted then (after appropriate preliminary work) the lid 18 is removed and the device according to the invention together with the flexible pipe 16 and the cartridges 14 can be removed, without the occurrence of difficulties even with the most difficult fluids.

As FIG. 1 shows, despite the relatively thin-walled style of construction, a large outflow volume 66 is obtained.

What is claimed is:

1. Device for a filter device, having
   a circular adapter,
   at least one connector extending downwards out of said adapter, to which connector a filter cartridge is attachable,
   a feed hole in said adapter,
   an outflow volume means above said adapter and communicating with said connector,
   a circular head above said adapter,
   a feed connector which extends upwards out of said head and communicates with said feed hole,
   an outflow connector which extends upwards out of said head and communicates with said outflow volume means, and
   comprising the improvement wherein:
   (a) Said adapter and said head are in one piece,
   (b) Said adapter and said head have circumferential regions and a circumferential wall thereat connecting said adapter and said head mechanically rigidly and tightly against a fluid medium, and
   (c) An inner wall connects said adapter and said head mechanically rigidly and tightly against a fluid medium around said feed hole and around said feed connector.

2. Device according to claim 1, wherein a sealing and clamping edge extends radially outwards from said circumferential regions.

3. Device according to claim 1, wherein said adapter has a floor and the height of the space of said outflow volume means is many times greater than the thickness of said floor, and the height of said inner wall and said circumferential wall corresponds to the height of said outflow volume means.

4. Device according to claim 3, wherein said height is at least five times greater.

5. Device according to claim 1, wherein transverse connectors subjectable to tension stress extend through said outflow volume means from said head at its under side to said adapter at its upper side.

6. Device according to claim 5, wherein said transverse connectors comprise rods of the material of said head and said adapter, and said rods are integral with both.

7. Device according to claim 6, wherein said transverse connectors extend perpendicularly from said upper side and said under side.

8. Device according to claim 5, wherein a mirror weld seam passes through said transverse connectors.

9. Device according to claim 1, wherein a mirror weld seam extends parallel to said head at its under side and said adapter at its upper side and passes through said circumferential wall and said inner wall.

10. Device according to claim 9, wherein said head and said adapter are of a thermoplastic material.

11. Device according to claim 1, wherein said device has a marginal zone and said feed connector and said outflow connector are positioned in said marginal zone and within said circumferential wall.

12. Device according to claim 11, wherein said feed connector and said outflow connector lie on a line deviating from a diameter line of said adapter and said head.

* * * * *